United States Patent Office 3,180,165
Patented Apr. 27, 1965

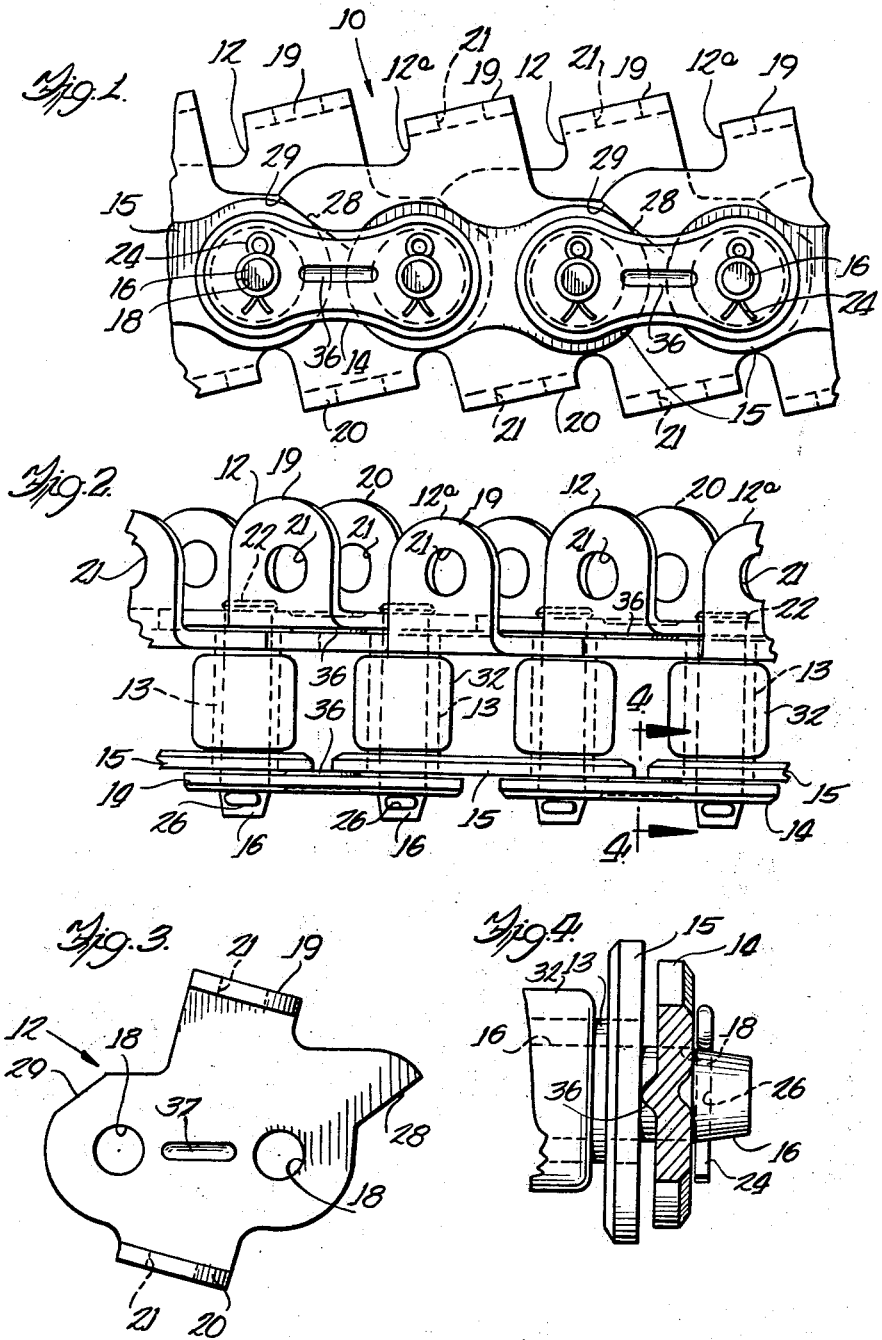

3,180,165
CHAINS
Raymond P. Bain, North Riverside, Ill., assignor to Link-Belt Company, a corporation of Illinois
Filed Feb. 25, 1963, Ser. No. 260,567
5 Claims. (Cl. 74—257)

This invention relates generally to link chain and more particularly to spacers arranged between adjacent overlapping side bar surfaces of a series of articulating chain links to aid in the passage of lubricant to the inner wear surfaces of the chain.

Conveyor or power transmission chain may be constructed of a series of overlapping links pivotally joined by suitable chain pins. In chains of this general construction adjacent side bars are positioned in overlapped end to end articulating relationship and, as a result, opposed plane surfaces of the overlapped ends of the side bars abut in close fitting relationship to prevent communication of externally applied lubricant to the load bearing surfaces of the chain pins and bushings.

Chain links must be lubricated to maintain their efficiency and give long trouble free service since lubrication provides a clean film of oil at all load carrying points where relative motion occurs. To effectively lubricate the chain joints, oil or other liquid lubricant must be delivered to the chain pins through spaces between the overlapped ends of the side bars.

It is also essential that adequate freedom of movement be maintained between the opposed surfaces of the overlapped ends of the side bars of chains. In many applications of conveyor chain, the atmosphere surrounding the chain is laden with dust and dirt or even corrosive materials. This material may work into the space between the opposed surfaces of overlapped side bars and, if the opposed surfaces are closely spaced, chain operation is adversely affected by the failure of adjacent links to properly articulate.

It is thus apparent that lubricant, which must pass to the pivot pins and bushings, is blocked both by the sealing proximity of the abutting plane surfaces of the side bars and the buildup of dirt, dust or other material between the side bars. In time, wear occurs at the joint bearing surfaces to shorten the useful life of the chain.

It is therefore a primary object of the present invention to provide a new and improved chain which will maintain adequate spacing between opposed surfaces of adjacent overlapping side bars of the chain links to at all times permit the free flow of lubricant to the internal wear surfaces of the links.

Another object of this invention is to provide laterally extending spacers to maintain clearance between opposed plane surfaces of adjacent overlapping chain link side bars.

A further object of this invention is to provide an overlapping pivotally connected chain link assembly providing space between opposed overlapped surfaces to prevent binding between adjacent side bars occasioned by operation in a dirt laden atmosphere.

Still another object of this invention is to provide a chain having overlapping side bars that are held in spaced relationship by means located a distance from the pin bores to allow passage of lubricant between overlapping links to the pin bores and to the wear surfaces of the pin and bushing assembly of the chain to prevent premature and excessive wear upon the links.

These and other objects and advantages of the invention will be apparent during the course of the following description.

In the accompanying drawings forming a part of this specification, and in which like reference characters are employed to designate like parts throughout the same;

FIGURE 1 is a side elevational view of a fragmentary portion of a chain constructed in accordance with the present invention;

FIGURE 2 is a top plan view of the chain shown in FIG. 1;

FIGURE 3 is a side elevational view of the outer side of a side bar of FIGS. 1 and 2 taken at the opposite side of the chain from FIG. 1 and;

FIGURE 4 is an enlarged fragmentary sectional view taken on lines 4—4 of FIG. 2.

In the drawings wherein for the purpose of illustration is shown a preferred embodiment of the invention, and first particularly referring to FIG. 1, the chain portion generally indicated by the reference numeral 10 includes a plurality of longitudinally disposed pivotally connected outer and inner carrier link side bars 12 and 12a, respectively, at one side thereof, and a plurality of pivotally connected outer and inner plain link side bars 14 and 15, respectively, at the opposite side thereof. Each of the inner carrier bars 12a is connected to a mating inner plain side bar 15 by cylindrical bushings 13 which are pressed into openings through opposite end portions of the bars. The outer carrier bars 12 are connected to the outer plain bars 14 by pins 16 which extend in tightly fitted relationship through pin holes 18 in opposite end portions of the bars and through the bushings 13 at adjacent end portions of two successive links of inner bars 12a and 15. The outer side bars 12 and 14 are thereby assembled in overlapping relationship with the inner side bars 12a and 15 as seen in FIGS. 1 and 2 with the pivot pins 16 connecting adjacent sets of inner and outer bars for articulating movement. The alternating arrangement of inner and outer bars causes adjacent overlapping end portions of the bars to present opposed plane surfaces surrounding each end portion of each pin.

The heads 22 at corresponding ends of pins 16 are flanged to maintain axial position upon assembly of the chain. A cotter pin 24 is received within the diametric opening 26 at the other end of each pin 16 to hold the pin in place in the opening 18 of the associated side bar 14.

The overlapping arrangement of the plain side bars 14 and 15 is similar to that of the carrier side bars 12 and 12a, the differences residing only in the configuration of the side bars. Therefore, the side bar configuration is not deemed essential to the disclosure of the present invention. The side bar 12 illustrated in FIG. 3, for example, has laterally outwardly extending flanged portions 19 and 20 at the top and bottom, respectively. The flanges 19 and 20 are formed with openings 21 to receive chain attachments (not shown). A shoulder 28 is formed on one end portion of each carrier link side bar 12 and 12a to engage an abutment 29 on the opposite end portion of the next adjacent bar 12 or 12a to restrict relative pivotal movement of the side bars 12 and 12a in one direction from their straight line relationship. These side bar shapes are old in the art and appear herein for purposes of illustration only.

Each bushing 13 illustrated in the accompanying drawings has a roller 32 rotatably mounted thereon for engagement with a sprocket or the like. It will be understood, however, that although for purposes of illustration the chain shown is a roller type chain, the present invention is adaptable for use with other types of link chain equally as well.

In order to maintain the opposed plane surfaces of overlapped side bars in fixed spaced relationship, a laterally extending projection 36 is formed upon the inner surface of each outer side bar 12 and 14. The projections 36 may assume any configuration desired so long as they extend into the space between the overlapping side bar surfaces in all positions of the side bars and allow lubricant communication to the bores of the bushings 13. The projections 36 will normally be spaced from the pin holes 18 to permit the lubricant to flow around the entire ends of the bushings 13. It is apparent that the projections 36 need be positioned on only one of two abutting side bar surfaces but could be formed on the outer surface of the inner side bars 12a and 15. FIGURE 3 shows a dimple 37 that is formed in the outer surface of an outer side bar 12 to provide a projection 36 on the opposite surface of the side bar. In FIG. 4, the projection 36 is so formed that it extends into the space between opposed surfaces at both overlapped end portions of each side bar. It is to be understood, however, that more than one projection may be employed and that they may be positioned anywhere between the opposed surfaces without departing from the spirit and scope of this invention.

The projection 36 is integrally stamped from the side bar, as shown in FIG. 4. This has the advantage of being a relatively simple and inexpensive method of forming the projection. It will be understood, however, that the projection may be a separate spacing member mounted upon the side bar surface.

I have illustrated and described what I now consider to be the preferred embodiment of my invention. It will be understood, however, that various alterations and modifications may be made without departing from the spirit of the invention and the scope of the subjoined claims.

I claim:

1. In a chain including a series of links having overlapped bars connected by a pivot pin, the improvement which comprises side bar spacer elements positioned between the overlapped bars to maintain the bars in spaced relationship to allow free passage of lubricant to the pivot pin, each spacer element comprising a laterally extending protuberance fixedly positioned on one of said bars having an area of engagement with the overlapped bar substantially smaller than the total opposed area of the overlapped portions of the bars.

2. A chain construction substantially in accordance with claim 1 wherein said spacer element is spaced from said pin to provide clearance between said bars around the entire circumference of the pin.

3. A chain construction substantially in accordance with claim 1 wherein said laterally extending protuberance is integrally formed on one side of each of said bars by indenting the opposite side of each of said bars.

4. A chain construction substantially in accordance with claim 1 wherein said spacer element extends into a position between its associated bar and the overlapped ends of the two adjacent bars.

5. A chain construction substantially in accordance with claim 1 wherein said spacer element is positioned on its associated side bar in engagement with the overlapped side bar in all positions of relative movement between said bars.

References Cited by the Examiner
UNITED STATES PATENTS 679,894   8/01   Hunt _____ 74—257 X
1,046,124  12/12  Wagner _____ 74—251
1,979,592  11/34  Weiss _____ 74—250 X

FOREIGN PATENTS 646,806   11/50  Great Britain.

DON A. WAITE, *Primary Examiner.*